(12) United States Patent
Cluckers et al.

(10) Patent No.: US 11,344,083 B2
(45) Date of Patent: May 31, 2022

(54) INSOLE DESIGN

(71) Applicant: RSPRINT N.V., Beringen (BE)

(72) Inventors: Tom Cluckers, Leuven (BE); Frederik Jansen, Meeuwen (BE); Jean Pierre Wilssens, Klapperstraat (BE)

(73) Assignee: RSPRINT N.V., Beringen (BE)

( * ) Notice: Subject to any disclaimer, the term of this patent is extended or adjusted under 35 U.S.C. 154(b) by 0 days.

(21) Appl. No.: 15/523,065

(22) PCT Filed: Oct. 29, 2015

(86) PCT No.: PCT/EP2015/075133
§ 371 (c)(1),
(2) Date: Apr. 28, 2017

(87) PCT Pub. No.: WO2016/066750
PCT Pub. Date: May 6, 2016

(65) Prior Publication Data
US 2017/0332733 A1    Nov. 23, 2017

Related U.S. Application Data

(60) Provisional application No. 62/073,650, filed on Oct. 31, 2014.

(51) Int. Cl.
*A43B 17/00* (2006.01)
*A43B 7/1405* (2022.01)
(Continued)

(52) U.S. Cl.
CPC ............ *A43B 17/006* (2013.01); *A43B 7/141* (2013.01); *A43B 7/142* (2013.01); *A43B 7/144* (2013.01);
(Continued)

(58) Field of Classification Search
CPC ....... A43B 17/006; A43B 17/14; A43B 17/02; A43B 7/141; A43B 7/28; A43B 7/144; A43B 7/142; A43D 2200/60; B33Y 80/00
See application file for complete search history.

(56) References Cited

U.S. PATENT DOCUMENTS 2,700,230 A * 1/1955 Beyer .................... A43B 21/32
                                                          36/81
4,170,078 A * 10/1979 Moss .................... A43B 13/203
                                                          36/28

(Continued)

FOREIGN PATENT DOCUMENTS

CN        102224977 A      10/2011
KR     20130100372 A       9/2013
(Continued)

OTHER PUBLICATIONS

Office Action issued in KR10-2017-7014374 dated Jun. 28, 2018.

*Primary Examiner* — Katharine G Kane
(74) *Attorney, Agent, or Firm* — Patterson + Sheridan, LLP (57) ABSTRACT

Designs and compositions of insoles for footwear are described herein. The insoles may be customized for a given foot. In some examples, the insole (100) includes a base comprising a variable thickness component (205), a directional stiffness component, a stability component, and a reinforcement component. The base may be a single composition that is manufactured using additive manufacturing techniques.

15 Claims, 9 Drawing Sheets

(51) Int. Cl.
  *A43B 7/142* (2022.01)
  *A43B 7/144* (2022.01)
  *B33Y 80/00* (2015.01)
  *A43B 7/28* (2006.01)
  *A43B 17/02* (2006.01)
  *A43B 17/14* (2006.01)

(52) U.S. Cl.
  CPC ............... *A43B 7/28* (2013.01); *A43B 17/02* (2013.01); *A43B 17/14* (2013.01); *B33Y 80/00* (2014.12); *A43D 2200/60* (2013.01)

(56) References Cited

U.S. PATENT DOCUMENTS

| | | | | |
|---|---|---|---|---|
| 4,546,556 A * | 10/1985 | Stubblefield | A43B 13/223 | 36/114 |
| 4,633,598 A * | 1/1987 | Moronaga | A43B 5/00 | 36/44 |
| 4,823,420 A * | 4/1989 | Bartneck | A43B 17/14 | 12/142 N |
| 4,823,483 A * | 4/1989 | Chapnick | A43B 17/14 | 36/43 |
| 5,231,776 A * | 8/1993 | Wagner | A43B 19/005 | 36/1 |
| 5,255,451 A * | 10/1993 | Tong | A43B 3/0057 | 36/28 |
| 5,337,492 A * | 8/1994 | Anderie | A43B 13/181 | 36/114 |
| 5,367,791 A * | 11/1994 | Gross | A43B 13/181 | 36/25 R |
| 5,461,800 A * | 10/1995 | Luthi | A43B 13/181 | 36/114 |
| 5,732,481 A | 3/1998 | Farhad | | |
| 5,960,566 A | 10/1999 | Brown | | |
| 5,983,524 A * | 11/1999 | Polegato | A43B 7/08 | 36/3 R |
| 6,070,342 A | 6/2000 | Brown | | |
| 6,141,889 A * | 11/2000 | Baum | A43B 13/223 | 12/146 M |
| 6,763,611 B1 * | 7/2004 | Fusco | A43B 13/125 | 36/25 R |
| 6,769,202 B1 * | 8/2004 | Luthi | A43B 13/184 | 36/28 |
| 7,900,380 B2 * | 3/2011 | Rich | A43B 7/142 | 36/154 |
| 8,732,982 B2 * | 5/2014 | Sullivan | A43B 7/144 | 36/25 R |
| 9,572,402 B2 * | 2/2017 | Jarvis | A43B 13/41 | |
| 9,788,602 B2 * | 10/2017 | Wynn | A43B 7/142 | |
| 2001/0001904 A1 * | 5/2001 | Hernadez | A43B 1/0009 | 36/28 |
| 2004/0194344 A1 * | 10/2004 | Tadin | A43B 7/141 | 36/44 |
| 2006/0201028 A1 * | 9/2006 | Chan | A43B 7/142 | 36/28 |
| 2006/0254087 A1 * | 11/2006 | Fechter | A43B 13/141 | 36/27 |
| 2007/0022630 A1 * | 2/2007 | Lundy | A43B 7/144 | 36/28 |
| 2007/0107261 A1 * | 5/2007 | Cheskin | A43B 7/141 | 36/44 |
| 2007/0227041 A1 * | 10/2007 | Menghini | A43B 13/20 | 36/28 |
| 2009/0126225 A1 | 5/2009 | Jarvis | | |
| 2010/0126044 A1 * | 5/2010 | Davis | A43B 1/0009 | 36/108 |
| 2012/0055043 A1 * | 3/2012 | Schindler | A43B 1/0009 | 36/83 |
| 2012/0090198 A1 * | 4/2012 | Stratten | A43B 1/0045 | 36/44 |
| 2012/0192452 A1 * | 8/2012 | Lewis | A43B 17/006 | 36/44 |
| 2013/0025156 A1 * | 1/2013 | Martinez | A43B 7/141 | 36/43 |
| 2014/0109441 A1 * | 4/2014 | McDowell | A43B 7/085 | 36/103 |
| 2014/0182170 A1 * | 7/2014 | Wawrousek | A43C 13/04 | 36/103 |
| 2014/0259744 A1 | 9/2014 | Cooper | | |
| 2015/0128448 A1 * | 5/2015 | Lockyer | A43B 7/1415 | 36/28 |
| 2015/0165690 A1 * | 6/2015 | Tow | B33Y 80/00 | 700/119 |
| 2015/0237959 A1 * | 8/2015 | Wynn | A43B 7/142 | 36/44 |
| 2016/0021972 A1 * | 1/2016 | Grelle | A43B 7/1415 | 36/140 |
| 2016/0051009 A1 * | 2/2016 | Kormann | A43B 13/14 | 36/103 |
| 2016/0095385 A1 * | 4/2016 | Nordstrom | A43B 13/181 | 36/29 |
| 2016/0219970 A1 * | 8/2016 | Jacob | A43B 7/148 | |
| 2016/0242502 A1 * | 8/2016 | Spanks | A43B 13/20 | |
| 2016/0324260 A1 * | 11/2016 | Guyan | A43B 13/143 | |
| 2016/0324261 A1 * | 11/2016 | Guyan | A43B 7/32 | |
| 2016/0345667 A1 * | 12/2016 | Kohatsu | A43B 13/186 | |
| 2016/0374428 A1 * | 12/2016 | Kormann | A43B 13/186 | 36/28 |
| 2016/0374431 A1 * | 12/2016 | Tow | A43B 17/003 | 36/43 |
| 2017/0017230 A1 * | 1/2017 | Spector | A43B 17/00 | |
| 2017/0224053 A1 * | 8/2017 | Truelsen | A43B 13/223 | |
| 2017/0231322 A1 * | 8/2017 | Gheorghian | A43B 13/186 | 267/141 |

FOREIGN PATENT DOCUMENTS

WO 2010126707 A1 11/2010
WO 2014100462 A1 6/2014

* cited by examiner

INSOLE DESIGN

CROSS-REFERENCE TO RELATED APPLICATIONS

This application claims the benefit of U.S. Provisional Application No. 62/073,650, filed Oct. 31, 2014, which is hereby incorporated by reference in its entirety.

BACKGROUND OF THE INVENTION

This application relates to the field of footwear, in particular to insole designs and compositions.

Traditional footwear is not customized for a user. Rather, the footwear is designed based on general characteristics that apply to most feet, most of the time. As a result, footwear is often not comfortable to users and/or not capable of correcting or preventing problematic foot-related conditions.

Accordingly, what is needed are improved insole designs that improve fit for a user of the insole and are capable of being manufactured efficiently and cost-effectively.

SUMMARY

This application describes improved insole designs and compositions.

In an embodiment, an insole for footwear is described. The insole comprises a base layer. The base layer comprises a variable thickness layer, a directional stiffness layer, a stability layer, and a reinforcement layer. The reinforcement layer is configured to reinforce a heel area of the insole.

In another embodiment, footwear is described. The footwear comprises a first stability layer shaped to conform to a first foot of a user. The stability layer comprises a plurality of unit cells.

In another embodiment, an insole for footwear is described. The insole comprises a reinforcement layer configured to reinforce a heel area of a base layer.

DETAILED DESCRIPTION OF CERTAIN INVENTIVE EMBODIMENTS

Custom footwear may be beneficial for the treatment of a variety of known conditions related to the foot. For example, pronation in the foot (i.e. inward roll of the foot while standing, walking and running) may lead to swelling and Achilles tendon issues. To treat the pronation, custom footwear may be designed to correct or improve the static and dynamic pressures on the foot. For example, the custom footwear may correct support under the medial arch of the foot, and may reduce the ability of the footwear to bend in certain directions.

As another example, a bunion may be treated with custom footwear that reduces medial load and provides customized support for the hallux (i.e. big toe). Other conditions may also be treated using custom footwear, such as: plantar fasciitis, arthritis, poor circulation, metatarsalgia, patellofemoral knee pain, shin splints, Achilles tendonitis, repetitive strain injuries and others as are known by persons of skill in the art.

In addition to treating existing, adverse foot conditions, custom footwear may also help to prevent injuries and the onset of foot conditions. For example, custom footwear may reduce stress related injuries to the foot, ankle, leg, knee, back, etc. by better distributing the weight during the impact of footfalls, or by altering the way a foot falls and rotates during dynamic movements. Similarly, custom footwear may prevent movement in certain directions (such as rolling ankle movement) while promoting movement in other directions (such as rolling of the forefoot during transitional movements.

Moreover, custom footwear may improve biomechanical performance (e.g. for athletes). For example, custom footwear may alter the angle of impact of a foot during dynamic activities such as running, which may in-turn increase the overall speed of the runner. Many other benefits of custom footwear exist, as are known by persons of skill in the art.

Custom footwear may be designed using data regarding a particular user's physical characteristics or attributes—so called "static" user data. For example, a user's foot size and static foot pressure (e.g. when standing) may be measured.

Custom footwear may also be designed using dynamic user data, such as dynamic foot pressure measurements. For example, the dynamic pressures on a user's foot may be measured during dynamic foot activities, such as: running, walking, jumping, landing, pivoting, rolling, rocking, etc. Virtually any functional biomechanical measurements may be used during the design of custom footwear.

Custom footwear may also be designed using non-user-specific data, such as a statistical population data. For example, the average shape of a foot of a certain size may be statistically determined, or otherwise available from existing statistical datasets. Further, the statistical averages for these and other physical foot characteristics may have associated statistical parameters, such as distributions, standard deviations, variances, and others as are known in the art. In this way, knowing a single foot characteristic associated with a user, such as a shoe size, may enable the use of many associated statistical foot characteristics (e.g. shape, size, etc.).

Ultimately, the aforementioned data types and others may be used to create custom footwear that accounts for: user-specific anatomical features, user-specific orthopedic needs, user-specific treatment needs, user-specific performance needs, and others as are known by persons of skill in the art. In particular, disclosed herein are examples of insole designs and compositions. In certain embodiments, the insole designs and compositions described herein may be customized for a particular wearer based on the aforementioned data types and to account for the aforementioned features and/or needs.

Footwear Portions

Custom footwear may comprise several individual footwear portions, such as, for example: a body, an insole, a midsole, and an outsole.

The body may be the portion of the footwear (such as a shoe) that surrounds the sides and top of a user's foot. The body may comprise portions, such as a heel support, ankle support, webbing, laces, straps, tongue, and other structures as are known in the art. In some cases the body may comprise two or more portions that are selectively bound by a user using, for example, laces or straps.

An insole may be the inner portion of footwear (such as a shoe) that directly contacts the bottom (and to some extent side) of a user's foot. A custom insole may be a fixed (i.e. permanent) portion of a shoe, or a removable portion of a shoe in different instances.

A midsole may be a footwear portion between the insole and the outsole, which, in some instances, is primarily a shock-absorbing portion. In some instances, the midsole may be designed to be primarily responsible for supporting a substantial portion of the weight of a user as well as providing shock absorbing properties for the footwear while in use. In other instances, the midsole may be designed to enhance the effectiveness of features found in the insole and/or outsole.

The outsole may be the outer-most portion of footwear, and may be designed to interface with the ground. In some instances, the outsole is alternatively known as a tread. The outsole may be designed with, for example, structures and/or textures for providing grip to the footwear on a variety of surfaces. Additionally, the outsole may be designed to protect a user's foot from puncture or other harmful intrusion. As with above, the outsole may additionally be designed to enhance the effectiveness of features found in the midsole.

Insole Design and Composition

Figure 1:
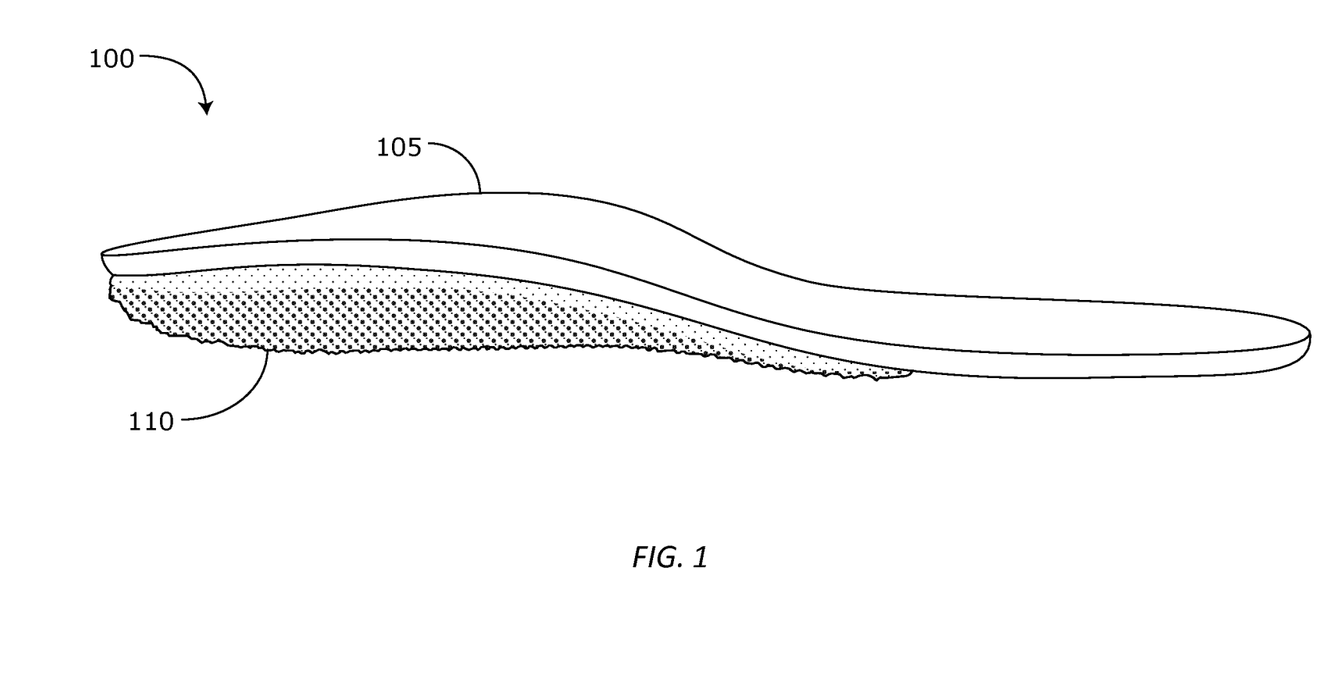
FIG. 1 depicts an embodiment of an insole.
Figure 2A:
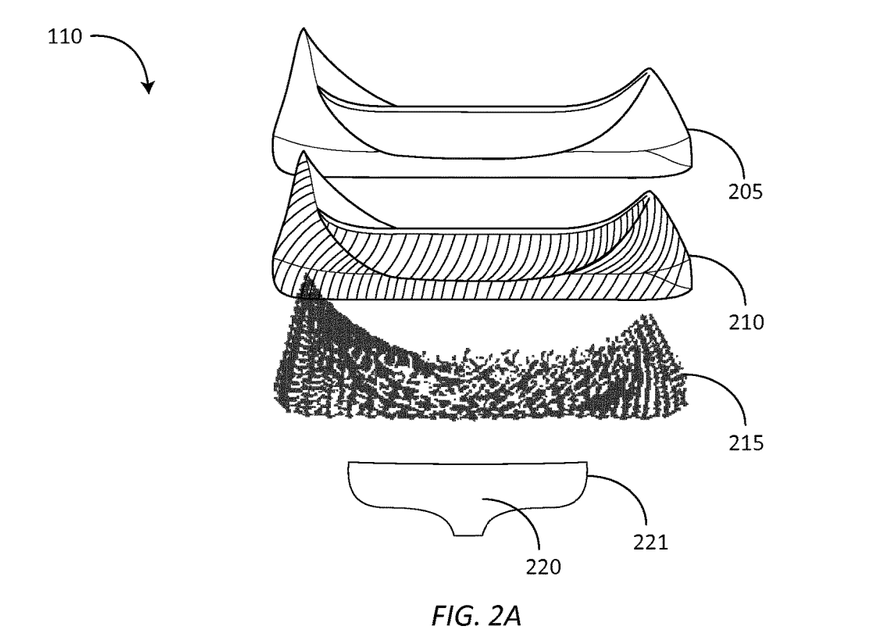
FIG. 2A depicts a rear view of an embodiment of components of a base layer of the insole of FIG. 1.
Figure 2B:
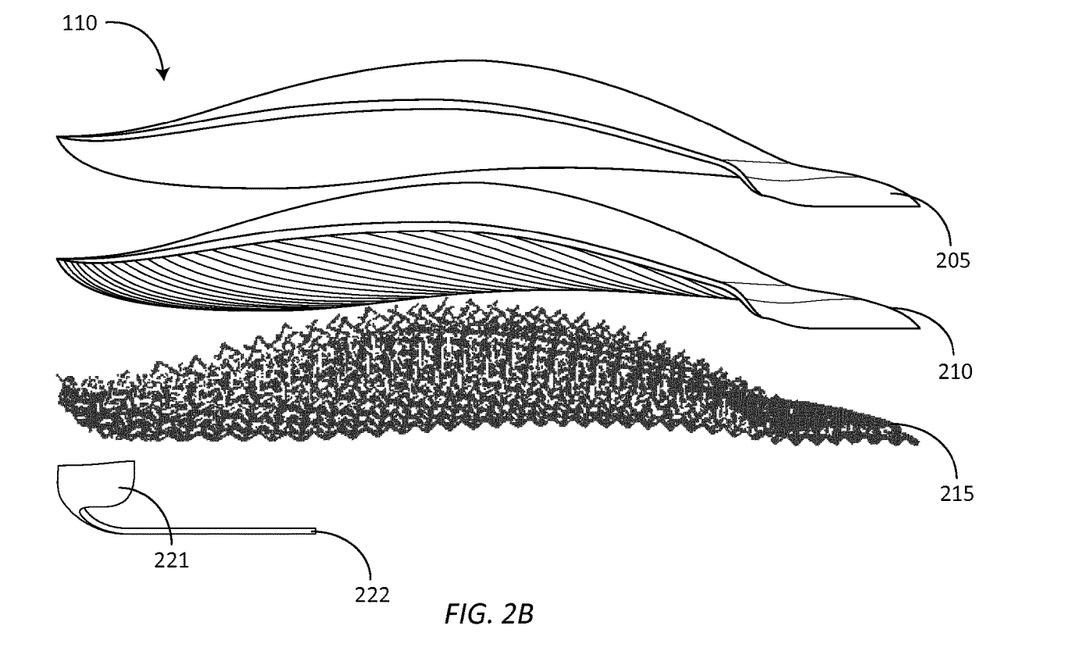
FIG. 2B depicts a lateral view of an embodiment of components of a base layer of the insole of FIG. 1.
Figure 2C:
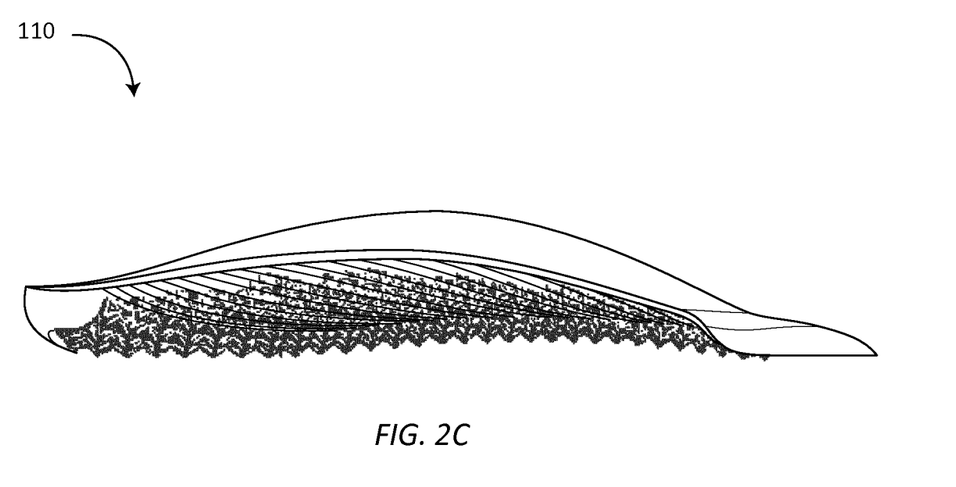
FIG. 2C depicts a lateral view of an embodiment of a base layer of the insole of FIG. 1.
Figure 2D:
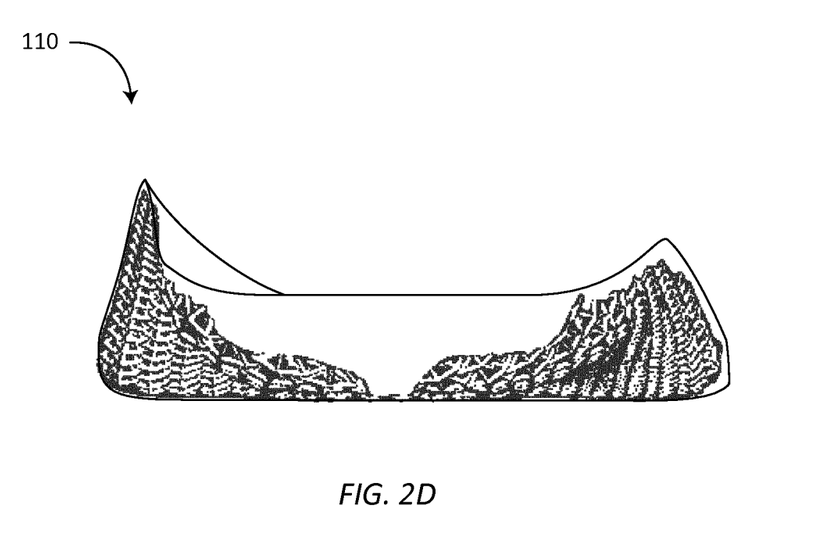
FIG. 2D depicts a rear view of an embodiment of a base layer of the insole of FIG.

In some embodiments, the insole design and composition may comprise a soft top layer (e.g., foam, rubber, etc.) affixed (e.g., using adhesive, glue, hook-and-loop fasteners, etc.) on top of a base layer. The base layer may be manufactured using additive manufacturing techniques and made out of a suitable material such as those described herein as being used for additive manufacturing. For example, the base layer may be made of a suitable plastic. In some embodiments, the base layer may be manufactured (e.g., using additive manufacturing also referred to in some cases as 3D printing) as a single part, even in embodiments where the base layer comprises multiple components. The base layer may either fully or partially support the top layer. FIG. 1 illustrates an example of such an insole 100. As shown, the insole 100 includes a soft top layer 105 and a base layer 110. The base layer 110 partially supports the soft top layer 105 in this example, as there is a portion of the soft top layer 105 without support from the base layer 110 underneath.

In some embodiments, the base layer 110 comprises multiple components. For example, as shown in FIGS. 2A, 2B, 2C, and 2D, the base layer 110 may comprise 4 components including a variable thickness layer 205, a directional stiffness layer 210, a stability layer 215, and a reinforcement layer 220. It should be noted that the base layer 110, in some embodiments, may include only some of the components shown in FIGS. 2A, 2B, 2C, and 2D, and/or may include additional components. Each of the components may be configured to have a particular function or purpose.

The variable thickness layer 205 may comprise a layer manufactured having variable thickness to control the stiffness of the insole 100 in different zones (i.e., areas or locations). For example, the variable thickness layer 205 may be generally shaped and customized to the foot of a user, for example based on the data types described herein. The variable thickness layer 205 may be a solid layer of material and may have generally smooth surfaces. In areas where greater stiffness is required, the variable thickness layer 205 may be made thicker. In areas where less stiffness is required, the variable thickness layer 205 may be made thinner. For example, certain portions of the variable thickness layer 205, such as an area designed to be near the toe of a wearer, may be made thinner to allow flexibility when walking. Further, in areas such as near the heel of the wearer, the variable thickness layer 205 may be made thicker to prevent unwanted flex.

The directional stiffness layer 210 may comprise a layer designed to be more flexible in certain directions and less flexible in other directions. For example, the directional stiffness layer 210 may be configured to flex more freely from left to right (i.e., side of foot to side of foot) and constrain flex more from front to back (i.e., toe to heel). In other embodiments, the directions used to constrain or promote flex may be different or customized, for example based on the data types described herein.

Figure 3:
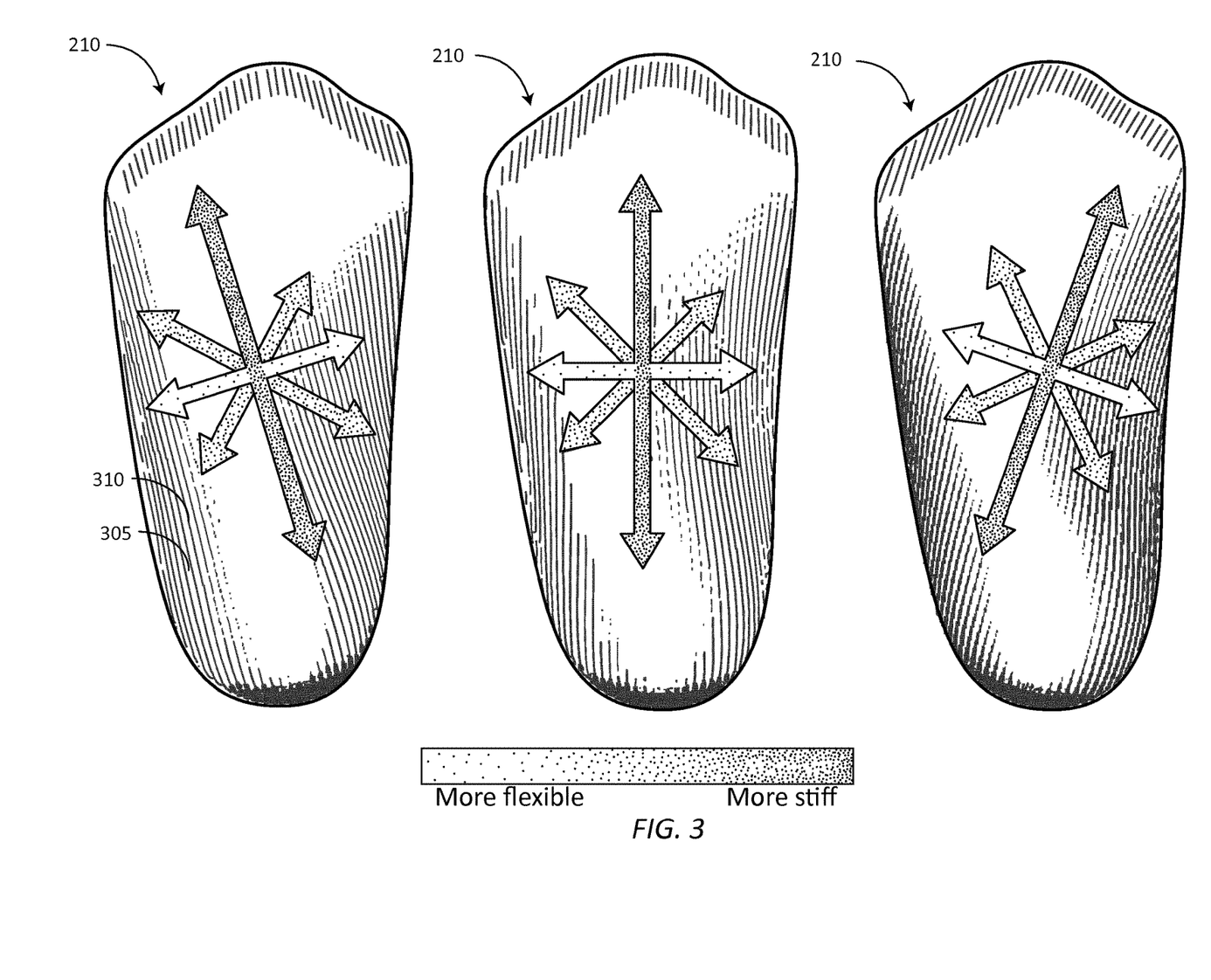
FIG. 3 depicts a bottom view of embodiments of a directional stiffness layer of the insole of FIG. 1.

The directional stiffness layer 210 may be generally shaped and customized to the foot of a user, for example based on the data types described herein. The directional stiffness layer 210 may be a solid layer of material. The directional stiffness layer 210 may comprise a series of bending lines, ribs, cuts, striations, waves, grooves, or other patterns 305, for example as shown in FIG. 3. The patterns 305 may be formed on one or more surfaces of the directional stiffness layer 210. For example, the bottom surface of the directional stiffness layer 210 may have the patterns 305 formed thereon, and the top surface of the directional stiffness layer 210 may be generally smooth.

The directional stiffness layer 210 may be more flexible in the direction perpendicular to the patterns 305. Accordingly, the directional stiffness layer 210 may be less flexible (i.e., more stiff) in the direction parallel to the patterns 305.

The stability layer 215 may comprise a layer configured to flex or flatten in different regions to increase stability in those regions. For example, the stability layer 215 may comprise a structure, for example made of unit cells configured to flex with respect to each other. For example, the structure may be configured to flex, deform, and/or compress in certain directions when pressure is applied, and then return to its original form when pressure is removed. Further, the structure may be a lightweight structure. The stability layer 215 may be generally shaped and customized to the foot of a user, for example based on the data types described herein. In some embodiments, the shape and design of the structure, for example the shape and placement of unit cells in the stability layer 215, may be configured or customized, for example based on the data types described herein.

A unit cell may be a portion of a structure that can be repeated and interconnected to create a flexible design for the stability layer 215. For example, in some embodiments, the unit cells of the stability layer 215 are designed to be manufactured using additive manufacturing techniques (e.g., 3D printing) collectively as a single form design (i.e., one continuous part).

In different embodiments, a unit cell may be made in a variety of different shapes and sizes. For example, a unit cell have may have a geometric shape (e.g., triangle, square, pentagon, etc.) of a given size. In some embodiments, the unit cell may have one or more connection portions, each connection portion being configured to connect to a connection portion of another unit cell, such that a single unit cell may connect to one or more other unit cells.

Figure 4:
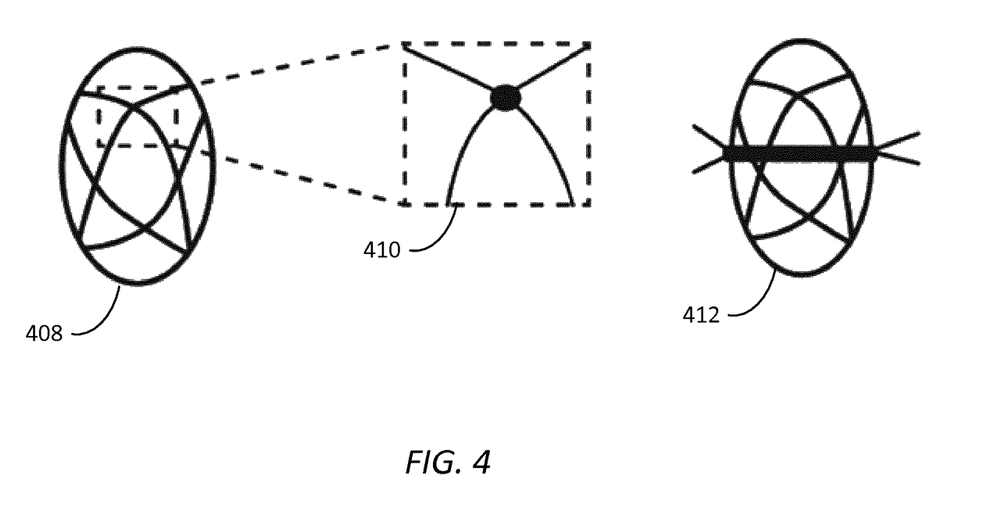
FIG. 4 depicts certain aspects of a structure of a stability layer of the insole of FIG.

FIG. 4 depicts certain aspects of embodiments of a unit cell, such as cell 408, which may comprise a plurality of ridges, which are connected at a node, such as node 410. Node 410 provides a physical connection between the ridges, which promotes resistance against change of their mutual angles. When cell 408 is elongate (i.e. substantially ellipsoid), the mechanical properties are different according to whether a load is applied in parallel with the long axis of the cell, or transversely to the long axis. Thus, the cell 408 will be less likely to compact, and to spring back quickly under load parallel to the long axis, while it will compress faster and be slower to rebound under load, transverse to the long axis.

Cell 412 includes a horizontal reinforcement, which strengthens cell 412 (i.e. opposes to deformation of cell 412) compared to cell 408. Such strengthening to structures may be useful in areas, such as a midsole, where the structures are supporting relatively larger weights and transient forces compared to other portions of the footwear. Notably, the increased strength and reduced elasticity of cell 412 due to the horizontal reinforcement primarily effects cell 412 in the direction of the reinforcement (i.e. side-to-side) and not in the direction perpendicular to the reinforcement (i.e. up and down). In this way, structures can be designed to provide specific directional characteristics to various parts of footwear incorporating them.

Figure 5:
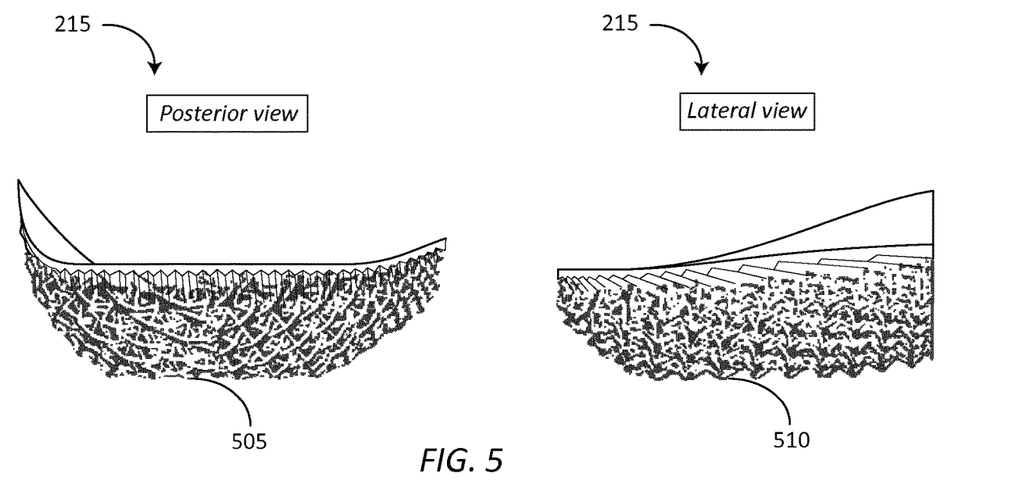
FIG. 5 depicts a posterior view and a lateral view of embodiments of a stability layer of the insole of FIG. 1.
Figure 6:
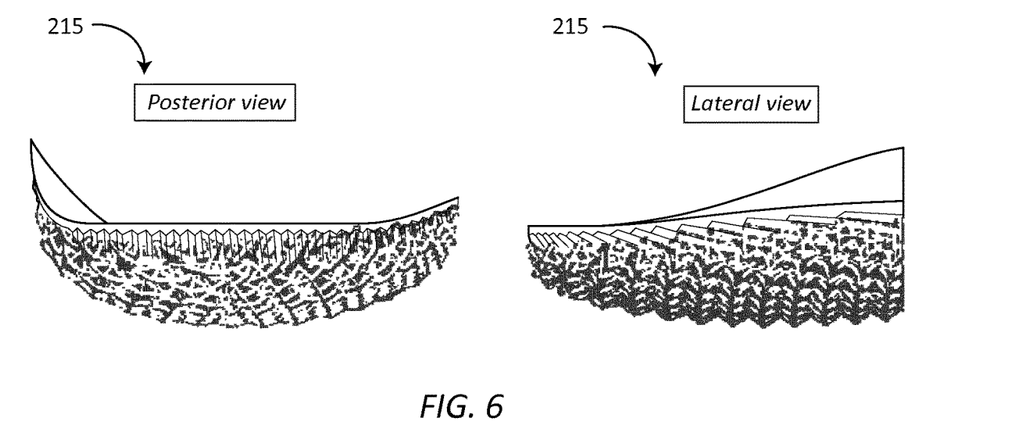
FIG. 6 depicts a posterior view and a lateral view of embodiments of a stability layer of the insole of FIG. 1.

In some embodiments, such as shown in FIG. 5, the stability layer 215 includes flattened areas (such as compared to not flattened areas shown in FIG. 6). For example, the structure may be designed to have a flatter shape in certain areas. These flattened areas may, for example, enhance stability (e.g., mediolateral stability). For example, the flattened areas may include a flattened heel area 505 and/or a flattened ball of the foot area 510 of the stability layer 215.

Figure 7:
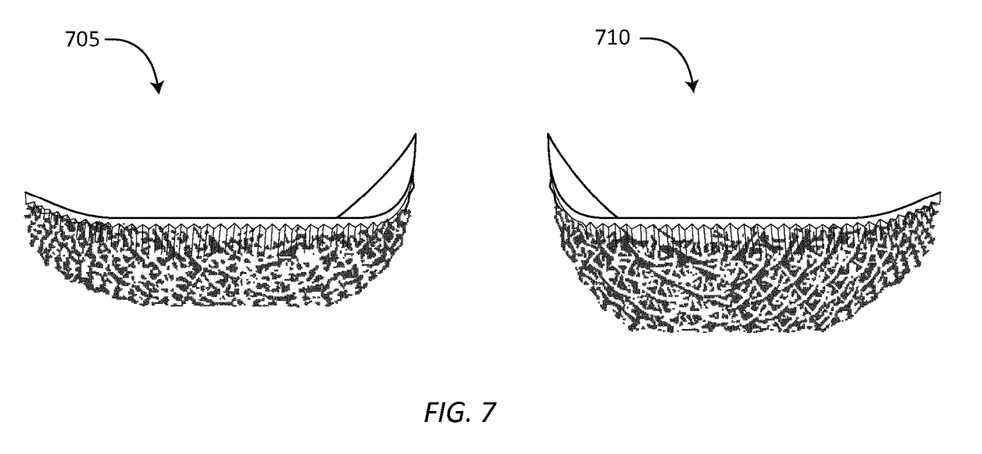
FIG. 7 depicts a posterior view of embodiments of a stability layer of the insole of FIG. 1.

Further, in some embodiments, the stability layer 215 may be configured to compensate for certain variables, such as difference in leg length or movement of the foot. For example, as shown in FIG. 7, a stability layer 705 for a left leg may be made shorter than a stability layer 710 for a right leg to compensate for variable leg length in individuals. The stability layer 215 may be made thinner or thicker (i.e., shorter or taller) by using fewer or more unit cells, respectively, in the design of the stability layer 215. In some embodiments, the stability layer 215 may be configured to correct certain movement of the foot of the user. For example, the stability layer 215 may be configured to correct pronation and/or supination, such as by tilting the structure of the stability layer 215 to the medial or lateral side.

Figure 8:
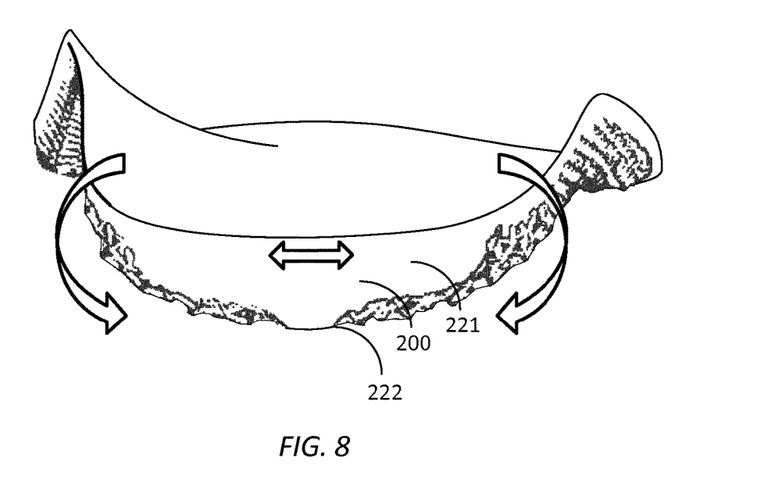
FIG. 8 depicts a posterior view of an embodiment of a reinforcement layer of the insole of FIG. 1.

The reinforcement layer 220 may comprise a layer formed to fit around the heel edge of the insole 100. The reinforcement layer 220 may be generally shaped and customized to the heel of a user, for example based on the data types described herein. The reinforcement layer 220 may be a solid layer of material and may have generally smooth surfaces. The reinforcement layer 220 may provide additional strength in the heel area that may be subject to high tensile forces at heel impact such as illustrated in FIG. 8. The reinforcement layer 220 may be of a sufficient thickness to provide the needed strength. For example, the reinforcement layer 220 may be configured to provide support in response to tensile forces from rotation of the base layer 110, such as during heel impact. These tensile forces may cause the base layer 110 to crack, unless the reinforcement layer 220 is provided to prevent such cracking by at least in part counteracting the tensile forces. Accordingly, the reinforcement layer 220 may include portions 221 that are configured extend along the lateral sides near the heel of the base layer 110 as shown. These portions 221 may help to compensate for tensile forces caused by rotation of the base layer 110 during heel impact. Further, the reinforcement layer 220 may include a portion 222 configured to extend along the bottom near the heel of the base layer 110. The portion 222 may provide reinforcement to compensate for forces pushing down on the base layer 110 such as due to heel impact.

Corrective Features

In some embodiments, insoles (e.g., the base layer of an insole) described herein may include one or more corrective features specifically designed to affect the fit and/or behavior of the insole when worn and used by a user. For example, one or more components of the insole may be shaped accordingly to include one or more corrective features (e.g., corrective structures).

In some embodiments, corrective features are meant to correct anatomical or biomechanical problems with a user's foot. For example, a user may have a relatively high arch, which creates support issues with regular footwear. As such, in some embodiments, insoles described herein may include support underneath the high arch in order to better distribute the user's weight in the footwear.

In some embodiments, corrective features are meant to prevent injury rather than to correct an injury or anatomical problem. For example, dynamic data can be used to determine the balance of a user's foot during movement (e.g. when running). The determined balance may be compared to optimal balance sequences, which may be derived from dynamic or statistical data characterizing users, such as athletes, who perform at a high level without injuries over long periods of time. Thus, corrective structures may be designed to promote better foot balance during movement in order to prevent injury.

In further embodiments, corrective features are meant to improve performance rather than to correct an existing or potential problem. For example, it has been shown that characteristics related to initial foot contact during running are related to running speed in athletes. With this in mind, dynamic data may be collected to determine characteristics of a user's initial foot contact during running, such as: landing zone (e.g. heel, mid-foot, fore-foot); the ratio between the respective forces acting on the median part and the lateral part of the foot; the maximum forces on the landing; the speed of the unreeling of the foot; and others as are known in the art. Based on these determination, an insole can be configured to alter the user's initial foot contact when running to improve running speed and/or efficiency.

Corrective features may, for example, comprise areas of reduced or increased thickness in one or more components of an insole, such as the variable thickness component 205. For example, an insole may have an area near the arch with increased thickness to provide additional support to the arch.

Corrective features may also comprise bending lines, ribs, cuts, striations, waves, grooves, or other patterns that enhance or inhibit bending of an insole in certain directions. The number, thickness, direction, and relative proximity of such corrective features may influence the propensity of the insole to bend in certain directions. For example, as discussed above, a component of an insole, such as the directional stiffness layer 210, may include waves in a particular direction in order to enhance the tendency for the insole to bend in a designed direction and to counteract the tendency to bend in an undesirable direction.

Corrective features may also comprise relatively simple or relatively complex structures which may be referred to as microstructures. For example, in some embodiments of the stability layer 215, the structure may comprise one or more of such complex microstructures. These complex microstructures, in some embodiments, may be formed out of unit cells, as described with respect to the stability layer 215. Examples of microstructures include, for example, beams, lattices, regular 3D grids, regular or irregular open or closed cell structures, foam or sponge-like formations, trusses, springs, shocks, triclinic, monoclinic, orthorhombic, hexagonal, trigonal, tetragonal, or cubic structures, and others as are known in the art. Microstructures may influence the characteristics of an insole, such as the mechanical behavior of an insole. Further, microstructures may influence other characteristics of an insole, such as: elasticity, visco-elasticity, rigidity, abrasion resistance and density. Notably, the prefix "micro" in "microstructure" primarily refers to the ability to customize the structure at a very small level. It does not limit the size of the microstructures as a whole. Indeed, structures comprising microstructures may be built to any size or shape.

In addition to the form of the microstructure, the position and size of the structure (or its component parts) may influence characteristics of an insole.

Additionally, characteristics of connection points between microstructures may also influence characteristics of an insole. For example, the thickness of a connection point may affect the mechanical properties of an insole. In some instances, connection points can be, for example, selectively thickened or thinned in order to affect the way an insole reacts to different loads in different directions.

In some instances, corrective features may be layered or combined to give an insole more complex characteristics. For example, in addition to varying the thickness of an insole, the individual layers making up the thickness of an insole may include unique corrective features, such as microstructures or others as described above.

In some instances, the corrective features may be on the surface of an insole. For example, surface features such as textures, patterns, lines, or others as described above may be used to provide more grip, more feel, more comfort, etc. to a user of the custom footwear.

In some instances, one or more of the aforementioned corrective features may be arranged in zones associated with an insole. Such zones may be configured to influence different mechanical properties of an insole in different areas. In some instances, an entire insole may be a zone, and in other instances an insole may include one or more zones. In some instances, a zone may comprise a single corrective feature, such as a microstructure.

In sum, the selection, arrangement and physical characteristics of different corrective features in an insole may be used to correct or counteract a user's biomechanical issues, prevent injuries, and/or promote increased performance Additive Manufacturing Insoles or portions of insoles (e.g., a base layer), according to the embodiments described herein, can be manufactured using additive manufacturing techniques. Many methods of additive manufacturing are known in the art, such as: Stereolithography (SLA), Selective Laser Sintering (SLS), Selective Laser Melting (SLM) and Fused Deposition Modeling (FDM), among others.

Stereolithography (SLA) is an additive manufacturing technique used for "printing" 3D objects one layer at a time. An SLA apparatus may employ, for example, a laser to cure a photo-reactive substance with emitted radiation. In some embodiments, the SLA apparatus directs the laser across a surface of a photo-reactive substance, such as, for example, a curable photopolymer ("resin"), in order to build an object one layer at a time. For each layer, the laser beam traces a cross-section of the object on the surface of the liquid resin, which cures and solidifies the cross-section and joins it to the layer below. After a layer has been completed, the SLA apparatus lowers a manufacturing platform by a distance equal to the thickness of a single layer and then deposits a new surface of uncured resin (or like photo-reactive material) on the previous layer. On this surface, a new pattern is traced thereby forming a new layer. By repeating this process one layer at a time, a complete 3D part may be formed.

Selective laser sintering (SLS) is another additive manufacturing technique used for 3D printing objects. SLS apparatuses often use a high-powered laser (e.g. a carbon dioxide laser) to "sinter" (i.e. fuse) small particles of plastic, metal, ceramic, or glass powders into a 3D object. Similar to SLA, the SLS apparatus may use a laser to scan cross-sections on the surface of a powder bed in accordance with a CAD design. Also similar to SLA, the SLS apparatus may lower a manufacturing platform by one layer thickness after a layer has been completed and add a new layer of material in order that a new layer can be formed. In some embodiments, an SLS apparatus may preheat the powder in order to make it easier for the laser to raise the temperature during the sintering process.

Selective Laser Melting (SLM) is yet another additive manufacturing technique used for 3D printing objects. Like SLS, an SLM apparatus typically uses a high-powered laser to selectively melt thin layers of metal powder to form solid metal objects. While similar, SLM differs from SLS because it typically uses materials with much higher melting points. When constructing objects using SLM, thin layers of metal powder may be distributed using various coating mechanisms. Like SLA and SLS, a manufacturing surface moves up and down to allow layers to be formed individually.

Fused Deposition Modeling (FDM) is another additive manufacturing technique wherein a 3D object is produced by extruding small beads of, for example, thermoplastic material from an extrusion nozzle to form layers. In a typical arrangement, the extrusion nozzle is heated to melt the raw material as it is extruded. The raw material then hardens immediately after extrusion from a nozzle. The extrusion nozzle can be moved in one or more dimensions by way of appropriate machinery. Similar to the aforementioned additive manufacturing techniques, the extrusion nozzle follows a path controlled by CAD or CAM software. Also similar, the part is built from the bottom up, one layer at a time.

Objects may be formed by additive manufacturing apparatus using various materials, such as: polypropylene, thermoplastic polyurethane, polyurethane, acrylonitrile butadiene styrene (ABS), polycarbonate (PC), PC-ABS, PLA, polystyrene, lignin, polyamide, polyamide with additives such as glass or metal particles, methyl methacrylate-acrylonitrile-butadiene-styrene copolymer, resorbable materials such as polymer-ceramic composites, and other similar suitable materials. In some embodiments, commercially available materials may be utilized. These materials may include: DSM Somos® series of materials 7100, 8100, 9100, 9420, 10100, 11100, 12110, 14120 and 15100 from DSM Somos; ABSplus-P430, ABSi, ABS-ESDI, ABS-M30, ABS-M30i, PC-ABS, PC-ISO, PC, ULTEM 9085, PPSF and PPSU materials from Stratasys; Accura Plastic, DuraForm, CastForm, Laserform and VisiJet line of materials from 3-Systems; Aluminium, CobaltChrome and Stainless Steel materials; Maranging Steel; Nickel Alloy; Titanium; the PA line of materials, PrimeCast and PrimePart materials and Alumide and CarbonMide from EOS GmbH.

Custom insoles according to the embodiments herein may be manufactured using additive manufacturing techniques. Advantageously, an additive manufacturing apparatus may "3D print" an entire insole, portions of an insole, or an entire piece of footwear comprising the insole in a single, integral workpiece. For example, rather than manufacturing components of insoles, midsoles and/or outsoles separately, an additive manufacturing device may create a custom insole layer-by-layer with non-homogeneous corrective features (e.g. microstructures) in each individual layer. Thus, 3D printing may provide a much higher degree of customization of insoles and footwear as compared to traditional manufacturing techniques.

Further, 3D printing custom insoles may advantageously reduce the number of materials and individual pieces that need to be manufactured in order to arrive at a desired footwear design. Moreover, additive manufacturing techniques may take advantage of a wider range of materials for creating custom insoles as compared to traditional manufacturing techniques.

In some instances, additive manufacturing techniques may improve traditional manufacturing steps. For example, insoles or portions of insoles may include surface textures, patterns, structures, etc., which may be useful for traditional manufacturing steps such as gluing, fusing, or otherwise fastening portions together. In some instances, the surface textures may be created by microstructures. As another example, an additively manufactured insole may be finished with a manufacturing layer that has a high porosity and/or a particular texture in order to improve the joining o f that portion with another footwear portion by glue or other fastening means.

Figure 9:
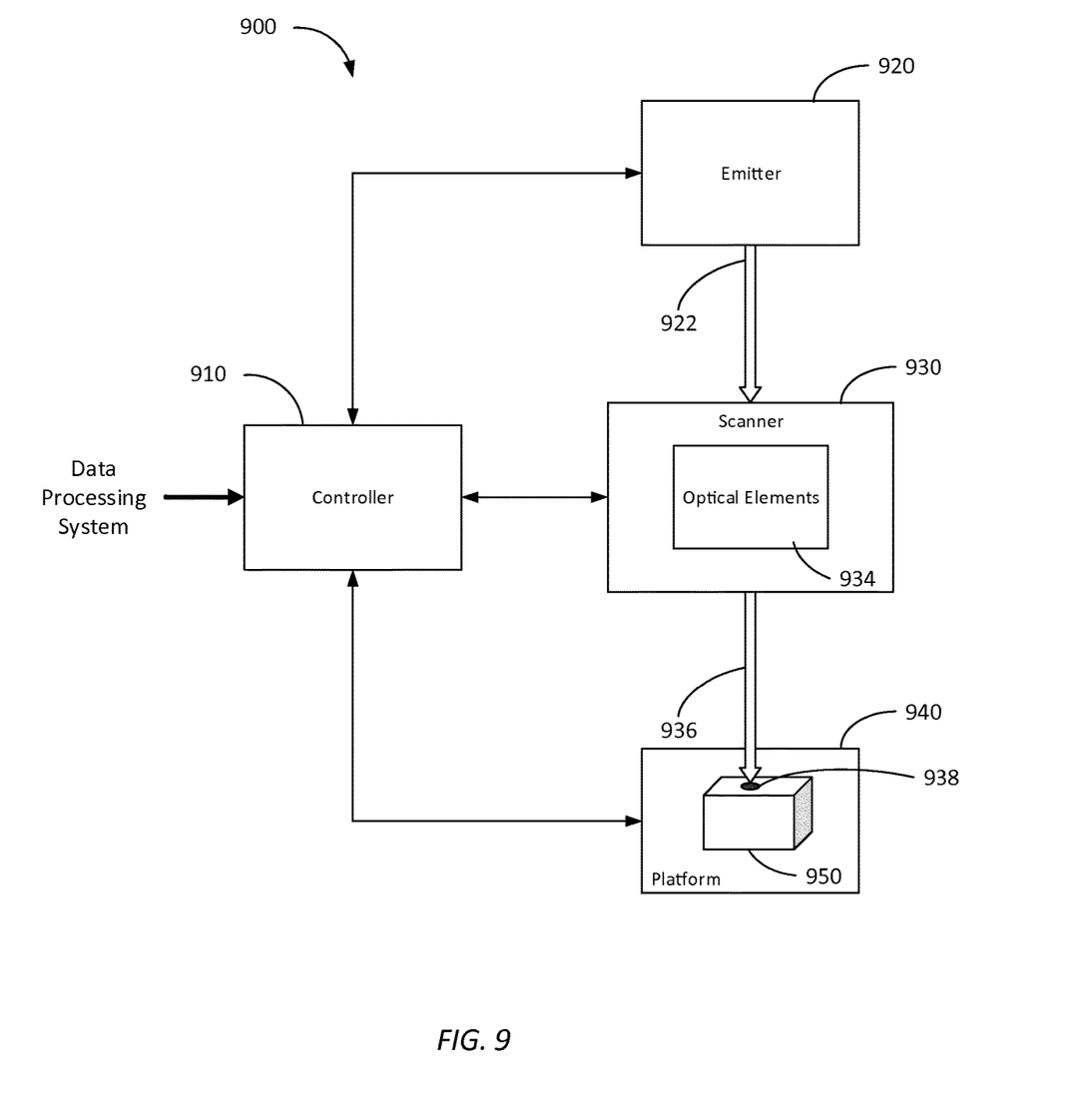
FIG. 9 depicts an exemplary additive manufacturing apparatus.

FIG. 9 depicts an exemplary additive manufacturing apparatus 900 that may be configured to perform additive manufacturing techniques such as SLA, SLS, and SLM, and others as are known in the art, in order to manufacture custom insoles or portions of insoles, such as the base layer of an insole according to any of the embodiments described herein.

Additive manufacturing apparatus 900 includes a controller 910, which is in data communication with an emitter 920, a scanner 930, and a platform 940. Notably, a similar additive manufacturing apparatus for performing FDM may substitute the emitter 920 and scanner 930 for an extrusion nozzle and associated mechanical controls.

Controller 910 may be, for example, a computer system with software for operating additive manufacturing apparatus 900. In other embodiments, controller 910 may be embodied as a general purpose processor, a digital signal processor (DSP), an application-specific integrated circuit (ASIC), a field-programmable gate array (FPGA) or other programmable logic device, discrete gate or transistor logic, discrete hardware components, or any suitable combination thereof designed to perform the functions described herein as are known by those of skill in the art.

As with before, the lines of data communication depicted between controller 910 and emitter 920, scanner 930, and platform 940 in FIG. 9 are representative only.

Controller 910 may control emitter 920. For example, controller 910 may send data signals to emitter 920 in order to power on and off the emitter. Additionally, controller 910 may control the output power of emitter 920. In some embodiments, controller 910 may control multiple emitters 920 (not shown) in the same additive manufacturing apparatus 900. In some embodiments, emitter 920 may additionally send data back to controller 910. For example, emitter 920 may send operational parameters such as power output, power use, temperature, and other operational parameters as are known in the art. The operational parameters of emitter 920 may be used by controller 910 to further control or optimize the processing of object 950.

Controller 910 may also control scanner 930. For example, controller 910 may cause the selection, manipulation, articulation, engagement or other use of optical elements 934. For example, controller 910 may cause a focusing lens element to move in order to affect the size of a resulting beam 936 or a size of a resulting beam spot 938. Further, controller 910 may cause a mirror or similar optical element to redirect resulting beam 936 in different directions and onto different locations of object 950. As yet another example, controller 910 may cause a shutter or similar optical element to mask resulting beam 936 even while emitter 920 is active.

In some embodiments, controller 910 may receive data back from scanner 930. For example, scanner 930 may send operational parameters such as power output, power use, temperature, beam size selection, beam power, beam direction, beam spot position, position of optical elements, condition of optical elements, and other operational parameters as are known in the art. The operational parameters of emitter 920 may be used by controller 910 to further control or optimize the processing of object 950. In some embodiments, controller 910 may be a part of scanner 930.

Controller 910 may also control platform 940. For example, controller 910 may cause platform 940 to move in one or more dimensions (e.g. up and down or side to side). Controller 910 may receive operational data from platform 940, such as position, temperature, weight, proximity, and others as are known to persons of skill in the art. Controller 910 may cause platform 940 to move in increments of one layer of object 950 at a time so that scanner 930 can process a layer of material to add to object 950. Layers of object 950 may be defined in three-dimensional design drawings (e.g. 3D CAD) or in one or more two dimensional cross-sectional drawings (e.g. 2D CAD).

In some embodiments, controller 910 may store or otherwise have access to object design data, such as 3D CAD drawings of an object (e.g., footwear, insoles, or portions of insoles) to be manufactured by optical additive manufacturing apparatus 900. For example, controller 910 may be a part of a computer system that also includes object design software and hardware, such as CAD software. In this way, controller 910 may have access to object design data in order to control emitter 920, scanner 930, and platform 940 and to manufacture object 950. In other embodiments, controller 910 may be connected by a communication path to a repository, database, or the like of design data, such as database 960 in FIG. 9.

Emitter 920 may be, for example, a laser emitter, such as a diode laser, pulsed laser, or fiber layer, or other types of laser as are known by those of skill in the art. In some embodiments, the emitter 920 may be an ultraviolet laser, carbon dioxide laser, or ytterbium laser. Emitter 920 may be other types of irradiating emitters as known by those of skill in the art.

Emitter 920 emits abeam, for example laser beam 922, which is then processed by scanner 930. Notably, while not shown in FIG. 9, optical elements such as mirrors, lenses, prisms, filters, etc., may be located between the emitter 920 and scanner 930.

In some embodiments, emitter 920 may be a part of scanner 930.

Scanner 930 may include optical elements 934. For example, optical elements may include lenses, mirrors, filters, splitters, prisms, diffusers, windows, displacers, and other elements as are known in the art. The optical elements 934 may be fixed or moveable based on data received by scanner 930 or controller 910.

Scanner 930 may also include sensors (not shown) that sense various operating parameters during operation of the scanner 930. Generally speaking, the sensors may provide data feedback to the scanner 930 and or controller 910 in order to improve calibration and manufacturing performance of optical additive manufacturing apparatus 900.

For example, scanner 930 may include position sensors, heat sensors, proximity sensors, and the like. Additionally, scanner 930 may include one or more image sensors. The image sensors could be used to provide visual feedback to an operator of optical additive manufacturing apparatus 900. The image sensors could also be used, for example, to analyze the size, focus and position of the beam spot incident on the object being manufactured for calibration and precise tracking. Further, the image sensor may be sensitive to heat (e.g. a thermal image sensor) and be used to determine the state of the underlying material (e.g. resin) as it is being processed. For example, a thermal image sensor may measure the local heating around the beam spot and/or the level of curing of the material being processed.

Platform 940 acts as a moveable base for the manufacture of object 950, which may be custom footwear, an insole, or a portion of an insole. As described above, platform 940 may move in one or more directions and be controlled by a controller, such as controller 910. For example, platform 940 may be controlled by controller 910 and moved one layer or cross-section of object 950 at a time during the manufacture of object 950.

Platform 940 may include sensors that determine operational data and transmit that data to controller 910 or to other parts of optical additive manufacturing apparatus 900.

Platform 940 may be enclosed by a container or vessel (not shown) containing manufacturing materials (e.g. photosensitive resin) that is processed by an incident beam spot directed by scanner 930. For example, scanner 930 may direct a beam over a layer of photosensitive resin, which causes the resin to cure and form a permanent layer of object 950.

Platform 940 may be made of any suitable material of adequate strength and resilience to serve as a manufacturing base for objects like object 950.

In addition to a container or vessel around platform 940, additive manufacturing apparatus 900 may also include a manufacturing material dispensing element. For example, an element may dispense a new layer of manufacturing material after each respective layer of object 950 is completed by the action of scanner 930.

Object 950 is formed by additive manufacturing apparatus 900 using various methods, such as SLA, SLS, SLM and others as are known by those of skill in the art.

Figure 10:
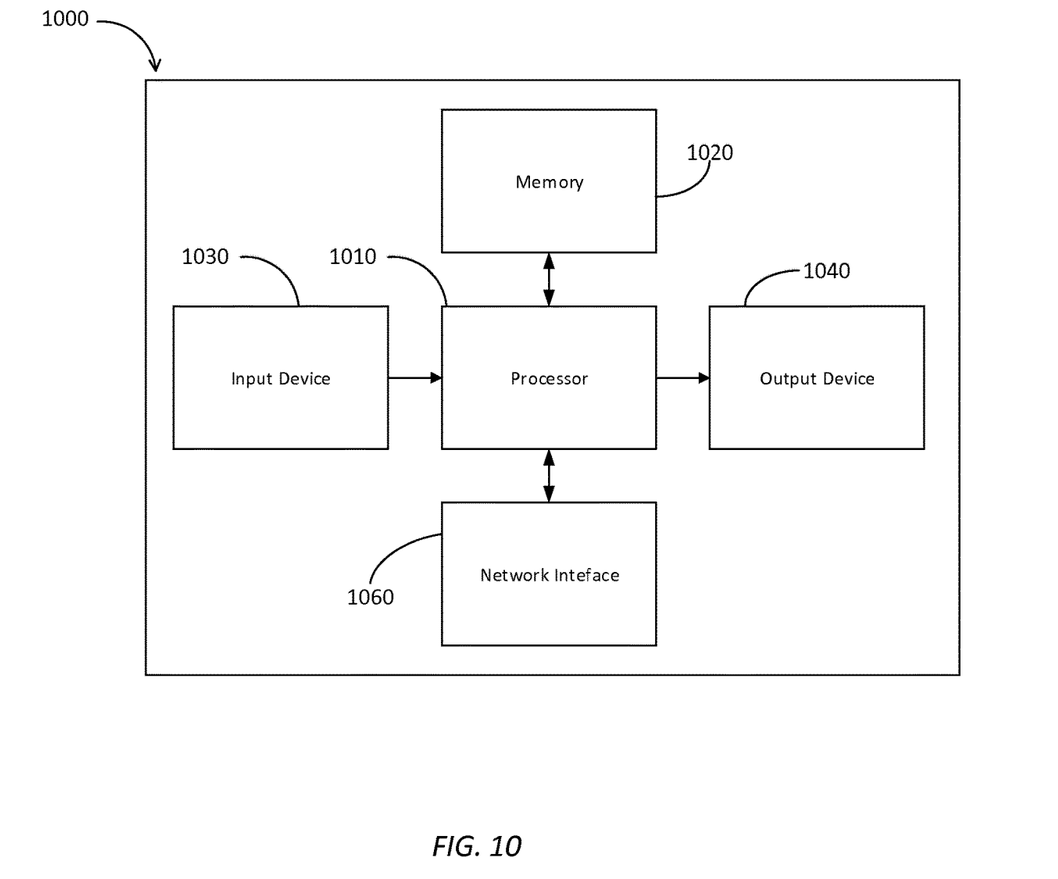
FIG. 10 depicts an exemplary computing device.

FIG. 10 depicts an exemplary computing device 1000, such as may be used in connection with the additive manufacturing apparatus 900 of FIG. 9.

The computing device 1000 includes a processor 1010. The processor 1010 is in data communication with various computer components. These components may include a memory 1020, an input device 1030, and an output device 1040. In certain embodiments, the processor may also communicate with a network interface card 1060. Although described separately, it is to be appreciated that functional blocks described with respect to the computing device 1000 need not be separate structural elements. For example, the processor 1010 and network interface card 1060 may be embodied in a single chip or board.

The processor 1010 may be a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 1010 may be coupled, via one or more data buses, to read information from or write information to memory 1020. The processor may additionally, or in the alternative, contain memory, such as processor registers. The memory 1020 may include processor cache, including a multi-level hierarchical cache in which different levels have different capacities and access speeds. The memory 1020 may further include random access memory (RAM), other volatile storage devices, or non-volatile storage devices. The storage can include hard drives, optical discs, such as compact discs (CDs) or digital video discs (DVDs), flash memory, floppy discs, magnetic tape, Zip drives, USB drives, and others as are known in the art.

The processor 1010 may also be coupled to an input device 1030 and an output device 1040 for, respectively, receiving input from and providing output to a user of the computing device 1000. Suitable input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to a computing device. The input device may also take the form of a touch-screen associated with the display, in which case a user responds to prompts on the display by touching the screen. The user may enter textual information through the input device such as the keyboard or the touch-screen. Suitable output devices include, but are not limited to, visual output devices, including displays and printers, audio output devices, including speakers, headphones, earphones, and alarms, additive manufacturing devices, and haptic output devices.

The processor 1010 further may be coupled to a network interface card 1060. The network interface card 1060 prepares data generated by the processor 1010 for transmission via a network according to one or more data transmission protocols. The network interface card 1060 may also be configured to decode data received via the network. In some embodiments, the network interface card 1060 may include a transmitter, receiver, or both. Depending on the specific embodiment, the transmitter and receiver can be a single integrated component, or they may be two separate components. The network interface card 1060, may be embodied as a general purpose processor, a DSP, an ASIC, a FPGA, or other programmable logic device, discrete gate or transistor logic, discrete hardware components, or any suitable combination thereof designed to perform the functions described herein.

The invention disclosed herein may be implemented as a method, apparatus, or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, FPGAs, ASICs, complex programmable logic devices (CPLDs), programmable logic arrays (PLAs), microprocessors, or other similar processing devices.

It will be appreciated by persons skilled in the art that numerous variations and/or modifications may be made to the invention without departing from the spirit or the scope of the invention as broadly described. The above described embodiments are, therefore, to be considered in all respects as illustrative and not restrictive.

What is claimed is:

1. An insole for footwear comprising:
    a base layer comprising:
    a variable thickness layer configured to control stiffness of the insole, wherein the variable thickness layer comprises a first portion having a first thickness and a second portion having a second thickness that is different than the first thickness;
    a directional stiffness layer comprising one or more patterns formed on one or more surfaces of the directional stiffness layer, wherein the one or more patterns are configured to generate a first flexibility in one direction and a second flexibility in a second direction that is different than the first direction, wherein the directional stiffness layer is a one-piece structure; and
    a reinforcement layer configured to provide support in response to tensile forces at a heel area of the insole, wherein the reinforcement layer comprises a first portion extending along a lateral side of the base layer, wherein the insole is a portion of the footwear configured to contact a user's foot and is positioned above a midsole and an outsole, wherein layers comprising the variable thickness layer, the directional stiffness layer, and the reinforcement layer are all made of a same single material, and the layers are formed successively on top of one another, and wherein the variable thickness layer, the directional stiffness layer, and the reinforcement layer are all manufactured together using additive manufacturing as a single continuous piece.

2. The insole of claim 1, wherein the one or more patterns comprise one or more of bending lines, ribs, cuts, striations, or grooves.

3. The insole of claim 1, further comprising a stability layer, wherein the stability layer is a structure comprising a plurality of unit cells.

4. The insole of claim 3, wherein at least one of the plurality of unit cells comprises a node and a connection portion configured to connect to another unit cell.

5. The insole of claim 3, wherein the stability layer comprises a flat portion in an area configured to be near a ball or heel of a foot.

6. The insole of claim 3, wherein the stability layer comprises microstructures.

7. The insole of claim 6, wherein the microstructures are one or more of beams, lattices, regular 3D grids, regular or irregular open or closed cell structures, foam or sponge-like formations, trusses, springs, shocks, triclinic, monoclinic, orthorhombic, hexagonal, trigonal, tetragonal, or a cubic structure.

8. The insole of claim 1, wherein at least one of the variable thickness layer, the directional stiffness layer, the stability layer, and the reinforcement layer is custom designed to be specific to a particular foot.

9. The insole of claim 1, further comprising a soft top layer.

10. The insole of claim 9, wherein the soft top layer is affixed to a top of the base layer.

11. The insole of claim 1, wherein the reinforcement layer comprises a second portion extending along a bottom portion of the base layer.

12. The insole of claim 1, wherein the variable thickness layer is positioned above the directional stiffness layer and the directional stiffness layer is positioned above the reinforcement layer.

13. The insole of claim 3, wherein the variable thickness layer is positioned above the directional stiffness layer, the direction stiffness layer is positioned above the stability layer, and the stability layer is positioned above the reinforcement layer.

14. The insole of claim 1, wherein the directional stiffness layer comprises a portion providing directional stiffness to the heel area of the insole.

15. The insole of claim 1, wherein the one or more patterns are formed from ribs.

* * * * *